United States Patent [19]
Kobayashi

[11] Patent Number: 5,802,141
[45] Date of Patent: Sep. 1, 1998

[54] ELECTRONIC PRIVATE BRANCH EXCHANGE

[75] Inventor: Masayuki Kobayashi, Tokyo, Japan

[73] Assignee: NEC Corporation, Tokyo, Japan

[21] Appl. No.: 649,547

[22] Filed: May 17, 1996

[30] Foreign Application Priority Data

May 17, 1995 [JP] Japan ............................ 7-117582

[51] Int. Cl.$^6$ ........................... H04M 1/24; H04M 3/08; H04M 3/22
[52] U.S. Cl. .................. 379/22; 379/12; 379/34; 379/221
[58] Field of Search ................... 379/1, 9, 10, 15, 379/22, 26, 27, 34, 201, 207, 219, 225, 231, 234, 2, 32, 14, 29, 232, 233, 220, 221

[56] References Cited

U.S. PATENT DOCUMENTS

| | | | |
|---|---|---|---|
| 5,210,740 | 5/1993 | Anzai et al. | 379/221 |
| 5,442,622 | 8/1995 | Hokari | 379/9 |
| 5,515,418 | 5/1996 | Yamaguchi et al. | 379/221 |

FOREIGN PATENT DOCUMENTS 237257  9/1990  Japan .

Primary Examiner—Paul Loomis
Assistant Examiner—Binh K. Tieu
Attorney, Agent, or Firm—Sughrue, Mion, Zinn, Macpeak & Seas, PLLC

[57] ABSTRACT

An electronic private branch exchange includes a first fault detection portion, a first alternate control portion, a second fault detection portion, and a second alternate control portion. The first fault detection portion detects occurrence of a fault on a private line for connection to a remote electronic private branch exchange (EPBX). The first alternate control portion selects one of a plurality of integrated services digital network (ISDN) lines registered in advance after the first fault detection portion detects occurrence of the fault, thereby forming a first alternate communication path for alternate connection to the remote EPBX. The second fault detection portion detects occurrence of a fault on a first alternate line formed by the first alternate control portion. The second alternate control portion selects one of the ISDN lines registered in advance except for an ISDN line on which occurrence of a fault has been detected after the second fault detection portion detects occurrence of the fault, thereby forming a second alternate communication path for alternate connection to the remote EPBX.

5 Claims, 2 Drawing Sheets

ELECTRONIC PRIVATE BRANCH EXCHANGE

BACKGROUND OF THE INVENTION

The present invention relates to an electronic private branch exchange and, more particularly, to an alternate connection scheme for an electronic private branch exchange.

Conventionally in an alternate connection scheme of this type, electronic private branch exchanges on originating and terminating sides are connected to each other via a private line or an alternate ISDN (Integrated Services Digital Network) line. When a fault occurs on the private line, they are connected via the alternate ISDN line. As this alternate connection method, e.g., a technique disclosed in Japanese Patent Laid-Open No. 2-237257 is available.

If a fault occurs on the alternate ISDN line during connection between the electronic private branch exchanges on the originating and terminating sides via the ISDN line, any one of methods is executed, i.e., communication is left disconnected, or the exchanges are connected again upon recovery of the ISDN line having the fault.

In the above-described conventional alternate connection scheme, when a fault occurs on the ISDN line upon alternate connection to the ISDN line due to a fault on the private line, a communication path may be left disconnected even upon recovery of the ISDN line, or an alternate path may not be connected until the ISDN line having the fault is recovered even if the exchanges have a plurality of alternate ISDN lines.

Summary of the Invention

It is an object of the present invention to provide an electronic private branch exchange which can immediately form another alternate path to recover an alternate state when a fault occurs on an ISDN line formed as an alternate path.

In order to achieve the above object, according to the present invention, there is provided an electronic private branch exchange comprising first fault detection means for detecting occurrence of a fault on a private line for connection to a remote electronic private branch exchange (EPBX), first alternate control means for selecting one of a plurality of integrated services digital network (ISDN) lines registered in advance after the first fault detection means detects occurrence of the fault, thereby forming a first alternate communication path for alternate connection to the remote EPBX, second fault detection means for detecting occurrence of a fault on a first alternate line formed by the first alternate control means, and second alternate control means for selecting one of the ISDN lines registered in advance except for an ISDN line on which occurrence of a fault has been detected after the second fault detection means detects occurrence of the fault, thereby forming a second alternate communication path for alternate connection to the remote EPBX.

DESCRIPTION OF THE PREFERRED EMBODIMENT

An embodiment of the present invention will be described below with reference to the accompanying drawings.

Figure 1:
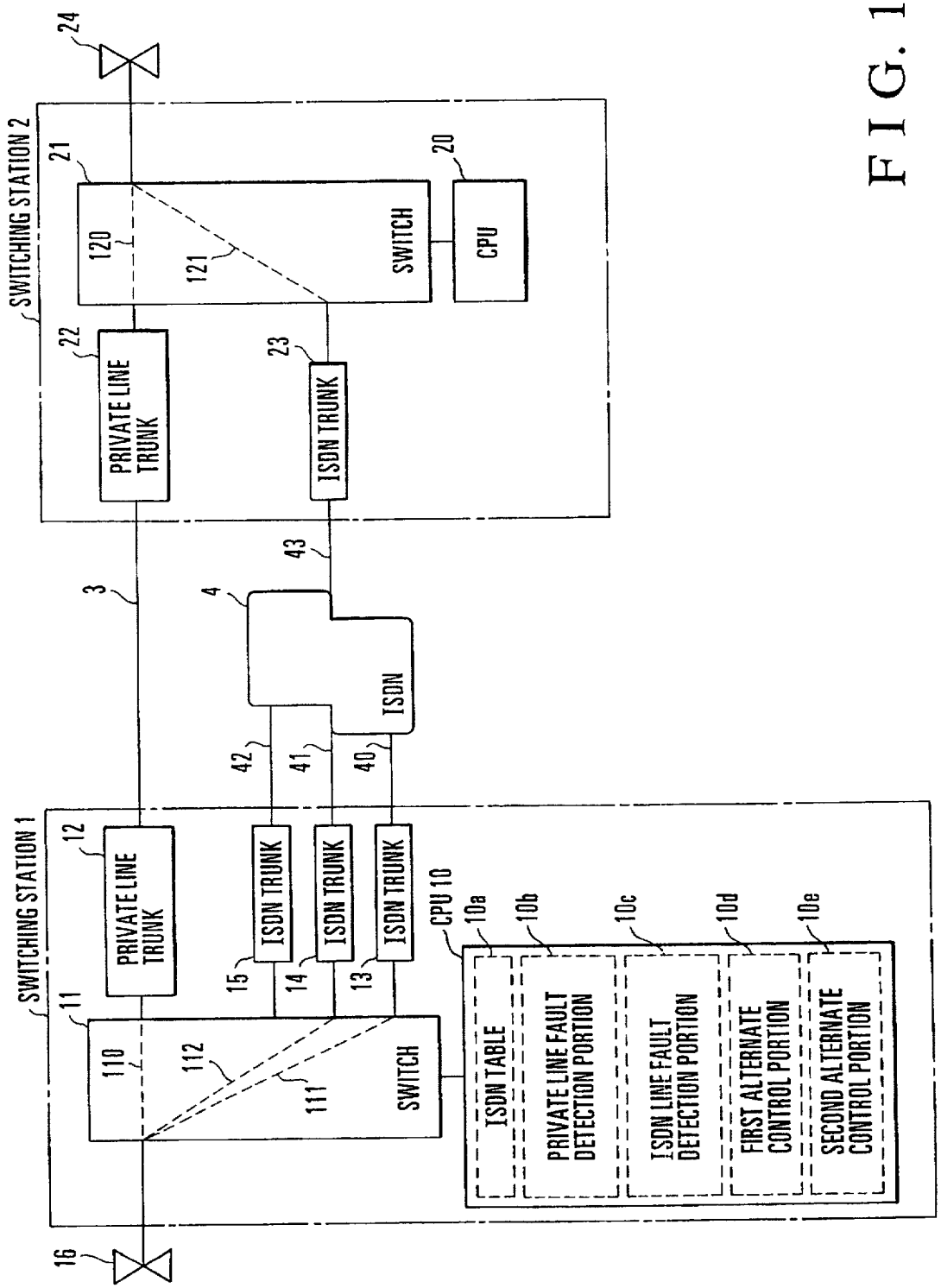
FIG. 1 is a block diagram showing an alternate connection system according to an embodiment to which an EPBX of the present invention is applied.

FIG. 1 shows an alternate connection system to which an electronic private branch exchange (EPBX) of the present invention is applied. Referring to FIG. 1, switching stations 1 and 2 each constituted by an EPBX are connected to each other via a private line 3 and to an ISDN 4 via ISDN lines 40 to 42 and an ISDN line 43, respectively. The switching station 1 includes a CPU (Central Processing Unit) 10 for performing switching control, a switch 11 for performing a switching connection operation under the control of the CPU 10, a private line trunk 12 and alternate ISDN trunks 13 to 15, all of which are connected to the switch 11. The switching station 2 includes a CPU 20 for performing switching control, a switch 21 for performing a switching connection operation under the control of the CPU 20, a private line trunk 22 and an alternate ISDN trunk 23, both of which are connected to the switch 21. Reference numerals 16 and 24 denote terminals respectively connected to the switches 11 and 21.

The CPU 10 of the switching station 1 comprises an ISDN table 10a storing information of the ISDN lines 40 to 42 registered for alternate connection, a private line fault detection portion 10b for detecting occurrence of a fault on the private line 3, an ISDN line fault detection portion 10c for detecting occurrence of a fault on an ISDN line connected for alternate connection, a first alternate control portion 10d for forming an alternate communication path upon occurrence of a fault on the private line 3, and a second alternate control portion 10e for forming another alternate communication path upon occurrence of a fault on the ISDN Line connected for alternate connection.

When the terminals 16 and 24 are to be connected to the private line 3 in the switching stations 1 and 2, they are connected to the private line trunks 12 and 22 by the switches 11 and 21, respectively. When the terminals 16 and 24 are to be connected to the ISDN 4 in the switching stations 1 and 2, they are connected to the ISDN trunks 13 to 15 and the ISDN trunk 23 by the switches 11 and 21, respectively. The above-described connection control is performed by the CPUs 10 and 20.

The alternate ISDN lines 40 to 42 between the switching station 1 and the ISDN 4 are respectively connected to the ISDN trunks 13 to 15, while the alternate ISDN line 43 between the switching station 2 and the ISDN 4 is connected to the ISDN trunk 23.

Figure 2:
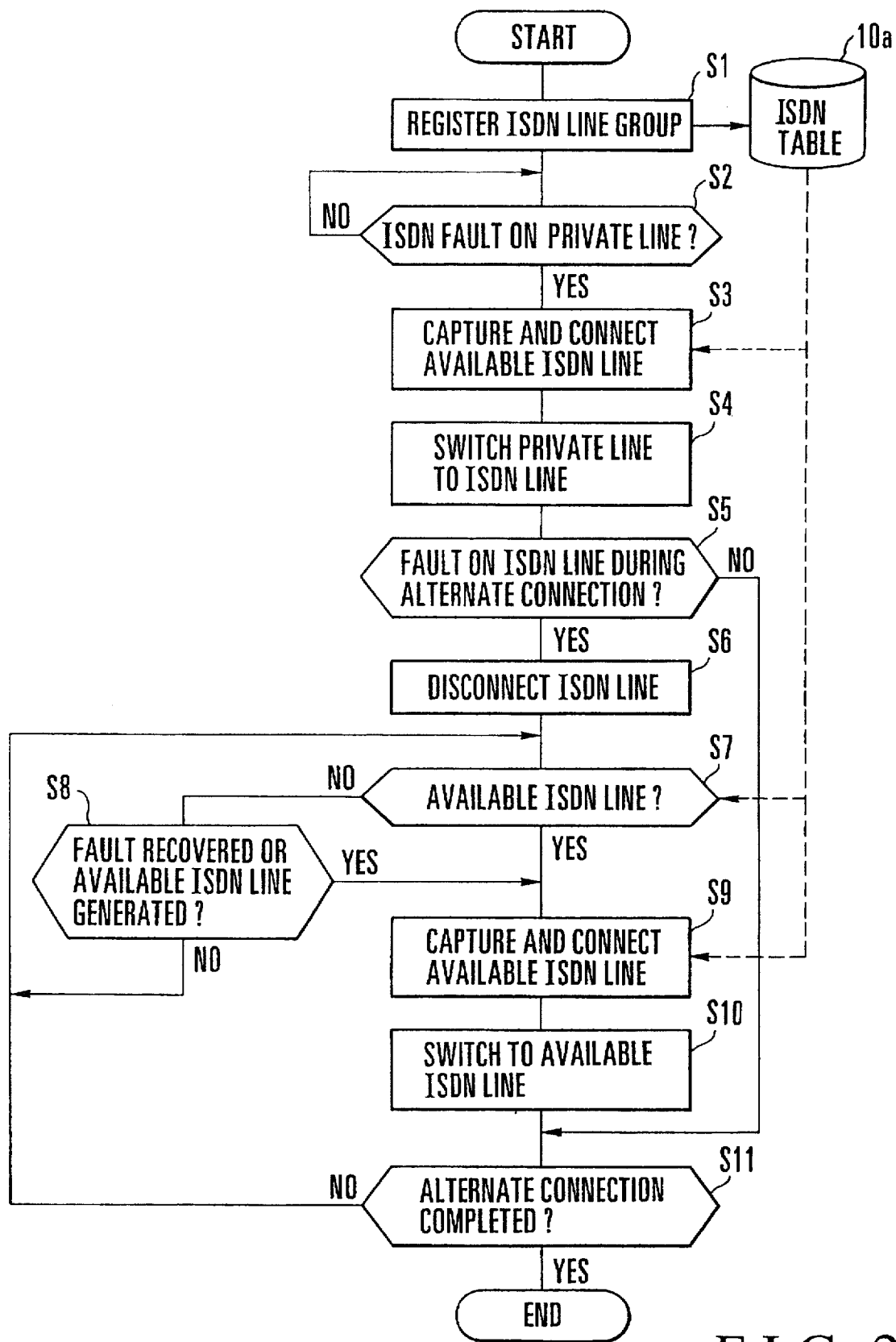
FIG. 2 is a flow chart showing the operation of the EPBX on an originating side shown in FIG. 1.

FIG. 2 shows the operation of an exchange on an originating side. The procedure of alternate connection control according to the present invention will be described with reference to FIGS. 1 and 2. The switching station 1 is referred to as an alternate originating station 1, and the switching station 2 is referred to as an alternate terminating station 2 hereinafter.

In the alternate originating station 1, at the start of processing, pieces of information of the ISDN lines 40 to 42 are registered as a group in the ISDN table 10a (step S1). Note that, in this embodiment, the ISDN table 10a is set in the CPU 10 but may be set outside the CPU 10.

If a line fault occurs on the private line 3 and is detected by the private line fault detection portion 10b of the CPU 10 in the alternate originating station 1 (step S2), the first alternate control portion 10d of the CPU 10 captures and connects one of the available ISDN lines 40 to 42 in the group on the basis of the contents of the ISDN table 10a to connect the alternate originating station 1 to the alternate terminating station 2 via the alternate ISDN line (step S3).

At this time, in the alternate originating station 1, the CPU 10 controls the switch 11 to switch a communication path 110 between the terminal 16 and the private line trunk 12 to a communication path 111 (alternate line) between the terminal 16 and the ISDN trunk 13 (step S4).

Meanwhile, also in the alternate terminating station 2, the CPU 20 controls the switch 21 to switch a communication path 120 between the terminal 24 and the private line trunk 22 to a communication path 121 (alternate line) between the terminal 24 and the ISDN trunk 23. With this operation, the terminal 16 is connected to the terminal 24 via the alternate path consisting of the switch 11, the ISDN trunk 13, the ISDN line 40, the ISDN 4, the ISDN line 43, the ISDN trunk 23, and the switch 21.

If a line fault occurs on the ISDN line 40 subjected to the above-described alternate connection, the ISDN line fault detection portion 10c of the CPU 10 in the alternate originating station 1 detects the fault on the ISDN line 40 via the ISDN trunk 13 (step S5). The CPU 10 releases the ISDN trunk 13 to disconnect the alternate path (step S6). At this time, the alternate path is also disconnected in the same manner in the alternate terminating station 2.

Thereafter, the alternate originating station 1 generates a call again to connect an alternate ISDN line again. At this time, the second alternate control portion 10e of the CPU 10 selects, captures, and connects, of the group constituted by the ISDN lines 40 to 42 registered in the ISDN table 10a in advance, one of the available ISDN lines except for the ISDN line 40 having the fault, thereby connecting the alternate originating station 1 to the alternate terminating station 2 via the alternate ISDN line (steps S7 and S9).

FIG. 1 shows a state in which the CPU 10 selects, the ISDN line 41 of the group constituted by the ISDN lines 40 to 42 to perform alternate connection upon occurrence of a line fault on the ISDN line 40 during alternate connection using the ISDN line 40.

More specifically, the CPU 10 controls the switch 11 to switch the communication path 111 (alternate line) between the terminal 16 and the ISDN trunk 13 to a communication path 112 (alternate line) between the terminal 16 and the ISDN trunk 14 (step S10). With this operation, the terminal 16 is connected to the terminal 24 via the alternate path consisting of the switch 11, the ISDN trunk 14, the ISDN line 41, the ISDN 4, the ISDN line 43, the ISDN trunk 23, and the switch 21.

The CPU 10 checks completion of alternate connection (step S11). If YES, the processing is ended, or if alternate connection fails and is not completed, the flow advances to step S7 to retry alternate connection.

To the contrary, if the entire group constituted by the ISDN lines 40 to 42 is used or has a fault, the CPU 10 repeatedly generates a call for alternate connection with a predetermined period. If a used ISDN line becomes available, or an ISDN line having a fault is recovered (step S8), the CPU 10 captures and connects the available ISDN line or recovered ISDN line in the next call generation operation to perform alternate connection via the ISDN 4 (step S9).

In this manner, when the CPU 10 detects occurrence of a fault on the ISDN lines 40 to 42 selected for alternate connection upon occurrence of a fault on the private line 3, the CPU 10 controls alternate connection via one of the plurality of ISDN lines 40 to 42 registered as a group in the ISDN table 10a in advance. With this operation, even if a fault occurs on the ISDN line 40 used to form an alternate path, another ISDN line 41 can be used as an alternate path to recover the alternate state rapidly.

As has been described above, according to the present invention, when a fault is detected on an ISDN line selected for alternate connection by an alternate function upon occurrence of a fault on a private line, the CPU controls alternate connection via one of a plurality of alternate ISDN lines registered in advance. With this operation, even if a fault occurs on an ISDN line used to form an alternate path, another alternate path can be rapidly formed to recover the alternate state.

What is claimed is:

1. An electronic private branch exchange comprising:

first fault detection means for detecting occurrence of a fault on a private line for connection to a remote electronic private branch exchange (EPBX);

first alternate control means for selecting one of a plurality of integrated services digital network (ISDN) lines registered in advance after said first fault detection means detects occurrence of the fault on the private line, thereby forming a first alternate communication path for alternate connection to said remote EPBX;

second fault detection means for detecting occurrence of a fault on said first alternate line formed by said first alternate control means; and second alternate control means for selecting one of said ISDN lines registered in advance, except for the ISDN line forming said first alternate communication path on which occurrence of a fault has been detected after said second fault detection means detects occurrence of the fault, thereby forming a second alternate communication path for alternate connection to said remote EPBX.

2. The exchange according to claim 1, further comprising storage means for storing information of said ISDN lines registered in advance, in which said first and second alternate control means select among said ISDN lines based on the information stored in said storage means.

3. The exchange according to claim 1, wherein, when any one of said ISDN lines is not available, said second alternate control means repeatedly generates a call, at a predetermined period, for alternate connection so as to form said second alternate communication path until a line becomes available.

4. The exchange according to claim 1, wherein said first and second fault detection means and said first and second alternate control means are constituted by a central processing unit.

5. The exchange according to claim 1, further comprising:

a private line trunk connected to a private line;

a plurality of ISDN trunks connected to said ISDN lines;

a switch for selectively connecting an originating subscriber to one of said private line trunk and said ISDN lines; and control means for controlling said switch to switch said private line trunk to one ISDN trunk selected by said first alternate control means, and connect the originating subscriber thereto in accordance with a detection output from said first fault detection means, and to switch from said ISDN trunk selected by said first alternate control means to one ISDN trunk selected by said second alternate control means, and connect the originating subscriber thereto in accordance with a detection output from said second fault detection means.

* * * * *